United States Patent
Toivanen et al.

(10) Patent No.: US 9,762,317 B2
(45) Date of Patent: *Sep. 12, 2017

(54) PLAYING SYNCHRONIZED MUTICHANNEL MEDIA ON A COMBINATION OF DEVICES

(71) Applicant: Nokia Technologies Oy, Espoo (FI)

(72) Inventors: Timo J. Toivanen, Mantsala (FI); Jarmo Saari, Turku (FI); Kari Hentunen, Aura (FI)

(73) Assignee: Nokia Technologies Oy, Espoo (FI)

( * ) Notice: Subject to any disclaimer, the term of this patent is extended or adjusted under 35 U.S.C. 154(b) by 3 days.

This patent is subject to a terminal disclaimer.

(21) Appl. No.: 14/809,435

(22) Filed: Jul. 27, 2015

(65) Prior Publication Data

US 2015/0333820 A1  Nov. 19, 2015

Related U.S. Application Data

(63) Continuation of application No. 13/595,090, filed on Aug. 27, 2012, now Pat. No. 9,112,991.

(51) Int. Cl.
*H04B 7/00* (2006.01)
*H04B 7/26* (2006.01)
*H04B 5/00* (2006.01)
*G06F 3/041* (2006.01)
(Continued)

(52) U.S. Cl.
CPC ............. *H04B 7/26* (2013.01); *G06F 3/0412* (2013.01); *G06F 3/04842* (2013.01);
(Continued)

(58) Field of Classification Search
CPC ...... H04B 5/0031; H04B 5/0062; H04B 5/02; H04B 1/69; H04B 7/26; H04B 7/2684;
(Continued)

(56) References Cited

U.S. PATENT DOCUMENTS

| 2003/0100274 A1 | 5/2003 | Brown ........................... 455/90 |
| 2005/0120079 A1 | 6/2005 | Anderson et al. ............ 709/203 |

(Continued)

FOREIGN PATENT DOCUMENTS

| JP | 2004-48601 A | 2/2004 |
| WO | WO-2006/051505 A1 | 5/2006 |

OTHER PUBLICATIONS

"Point-to-Multipoint Stereo Audio Transmitting System Based on Bluetooth", He Sian et al., 2010 International Conference on Communications and Mobile Computing, IEEE Computer Society, 2010, pp. 323-328.

(Continued)

*Primary Examiner* — Golam Sorowar
(74) *Attorney, Agent, or Firm* — Harrington & Smith

(57) ABSTRACT

An apparatus including a wireless configuration interface system configured to assist in establishing a wireless short range communication connection of the apparatus with at least one device; and a wireless short range communication system which, after the wireless communication connection has been established with the at least one device, is configured to separately transmit to each of the at least one device at least one channel of multichannel media for either at least two of the devices to each play a different one of the channels of the multichannel media, or at least two of the apparatus and the at least one device to each play a different one of the channels of the multichannel media.

21 Claims, 7 Drawing Sheets

(51) Int. Cl.
*G06F 3/0484* (2013.01)
*H04L 29/06* (2006.01)
*H04M 1/725* (2006.01)

(52) U.S. Cl.
CPC ....... *G06F 3/04847* (2013.01); *H04B 5/0031* (2013.01); *H04L 65/4069* (2013.01); *H04M 1/7253* (2013.01); *H04M 1/72558* (2013.01); *H04M 2250/02* (2013.01)

(58) Field of Classification Search
CPC ......... H04L 2012/2841; H04L 12/2809; H04L 12/282; H04L 2012/2849; H04L 65/4069; H04L 12/281; H04L 12/2816; H04L 2209/80; H04L 65/1069; H04L 65/403; H04L 65/4076; H04L 67/16; H04L 7/041; H04M 1/7253; H04M 1/0264; H04M 1/0266; H04M 1/72558; H04M 2250/02; H04M 2250/04
See application file for complete search history.

(56) References Cited

U.S. PATENT DOCUMENTS

| | | | |
|---|---|---|---|
| 2006/0133309 A1* | 6/2006 | Mathis ................. | H04B 7/2684 370/328 |
| 2007/0087686 A1* | 4/2007 | Holm ....................... | H04S 7/30 455/3.06 |
| 2008/0175403 A1 | 7/2008 | Tan et al. ...................... | 381/77 |
| 2009/0111378 A1* | 4/2009 | Sheynman ............ | H04W 8/005 455/41.1 |
| 2009/0274326 A1 | 11/2009 | Jia et al. ....................... | 381/311 |
| 2009/0304214 A1 | 12/2009 | Xiang et al. ................. | 381/307 |
| 2010/0194335 A1* | 8/2010 | Kirby ..................... | H02J 5/005 320/108 |
| 2010/0303244 A1* | 12/2010 | Kim ....................... | H04H 20/33 381/2 |
| 2011/0150228 A1 | 6/2011 | Yoon et al. ..................... | 381/17 |
| 2011/0280401 A1 | 11/2011 | Kirkup et al. ................ | 380/270 |
| 2012/0057709 A1 | 3/2012 | Mishra ............................ | 381/17 |
| 2012/0237054 A1 | 9/2012 | Eo ............................ | H04R 5/04 381/80 |
| 2013/0045681 A1* | 2/2013 | Dua .................. | G06F 17/30058 455/41.1 |

OTHER PUBLICATIONS

"VSX-822-K-5.1 Channel 3D Ready A/V Receiver", Product Brochure, Pioneer Electronics USA, Jul. 2, 2012, 4 pgs.
"Nokia Play 360° Wireless Speaker MD-50W", User Manual, 2011, Issue 1.1, 8 pgs.

* cited by examiner

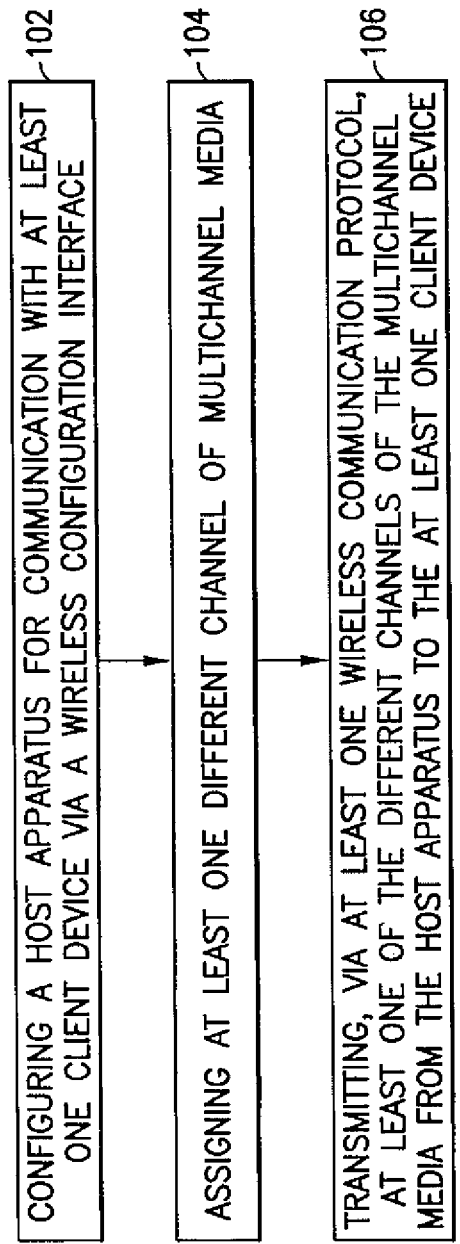

PLAYING SYNCHRONIZED MUTICHANNEL MEDIA ON A COMBINATION OF DEVICES

CROSS REFERENCE TO RELATED APPLICATION

This application is a continuation of copending application Ser. No. 13/595,090 filed Aug. 27, 2012 which is hereby incorporated by reference in its entirety.

BACKGROUND

Technical Field

The exemplary and non-limiting embodiments relate generally to multichannel media and, more particularly, to playing different channels of multichannel media on a combination of devices at a same time.

Brief Description of Prior Developments

Wireless surround speaker systems are known. In addition, host device broadcasting is also a well-known concept. Host device broadcasting streams the same audio channel for multiple capable devices and might not include synchronization between host and client. In addition these work only within a single protocol, such as in BLUETOOTH or WiFi for example.

SUMMARY

The following summary is merely intended to be exemplary. The summary is not intended to limit the scope of the claims.

In accordance with one aspect, an example apparatus comprises a wireless configuration interface system configured to assist in establishing a wireless short range communication connection of the apparatus with at least one device; and a wireless short range communication system which, after the wireless short range communication connection has been established with the at least one device, is configured to separately transmit to each of the at least one device at least one channel of multichannel media for either: at least two of the devices to each play a different one of the channels of the multichannel media, or at least two of the apparatus and the at least one device to each play a different one of the channels of the multichannel media.

In accordance with another aspect, an example apparatus comprises a wireless configuration interface system configured to at least partially assist in establishing a wireless short range communication connection of the apparatus with at least one client device; and a system for allowing a user to configure channel allocation of channels of multichannel media to at least two of the at least one client device and the apparatus, where the apparatus is configured to stream at least one of the channels of multichannel media to the at least one client device for the channels of the multichannel media to be played at a substantially same time on a combination of at least two of the at least one device and the apparatus.

In accordance with another aspect, an example method comprises connecting a wireless short range communication interface of a host apparatus with at least one client device with assistance of a different wireless configuration interface of the host apparatus; and selectively configuring channel allocation of channels of multichannel media to at least two of the at least one client device and the host apparatus, where the host apparatus is configured to stream at least one of the channels of the multichannel media to the at least one client device for the channels of the multichannel media to be played at a substantially same time on a combination of at least two of the at least one device and the apparatus.

In accordance with another aspect, an example comprises a non-transitory program storage device readable by a machine, tangibly embodying a program of instructions executable by the machine for performing operations, the operations comprising connecting a wireless short range communication interface of a host apparatus with at least one client device with assistance of a different wireless configuration interface of the host apparatus; and selectively configuring channel allocation of channels of multichannel media to at least two of the at least one client device and the host apparatus, where the host apparatus is configured to stream at least one of the channels of the multichannel media to the at least one client device for the channels of the multichannel media to be played at a substantially same time on a combination of at least two of the at least one device and the apparatus.

BRIEF DESCRIPTION OF THE DRAWINGS

The foregoing aspects and other features are explained in the following description, taken in connection with the accompanying drawings, wherein:

FIG. 10 is a diagram illustrating an example method.

DETAILED DESCRIPTION OF EMBODIMENTS

Figure 1:
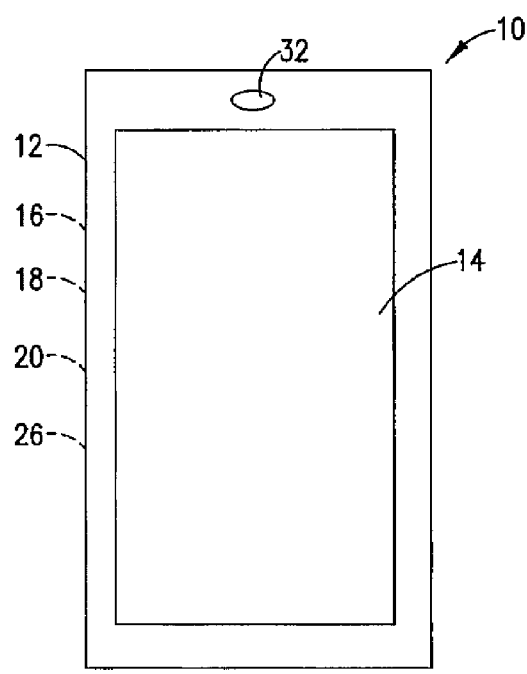
FIG. 1 is a front view of an example embodiment of an apparatus.

Referring to FIG. 1, there is shown a front view of an apparatus 10 incorporating features of an example embodiment. Although the features will be described with reference to the example embodiments shown in the drawings, it should be understood that features can be embodied in many alternate forms of embodiments. In addition, any suitable size, shape or type of elements or materials could be used.

The apparatus 10 may be hand-held communications device which includes a telephone application. The apparatus 10 may also comprise an Internet browser application, camera application, video recorder application, music player and recorder application, email application, navigation application, gaming application, and/or any other suitable electronic device application. Referring to both FIGS. 1 and 2, the apparatus 10, in this example embodiment, comprises a housing 12, a display 14, a receiver 16, a transmitter 18, a rechargeable battery 26, and a controller 20 which can include at least one processor 22, at least one memory 24, and software. However, all of these features are not necessary to implement the features described below.

The display 14 in this example may be a touch screen display which functions as both a display screen and as a user input. However, features described herein may be used in a display which does not have a touch, user input feature. The user interface may also include a keypad (not shown). The electronic circuitry inside the housing 12 may comprise a printed wiring board (PWB) having components such as the controller 20 thereon. The circuitry may include a sound transducer provided as a microphone and a sound transducer 32 provided as a speaker and/or earpiece.

Figure 2:
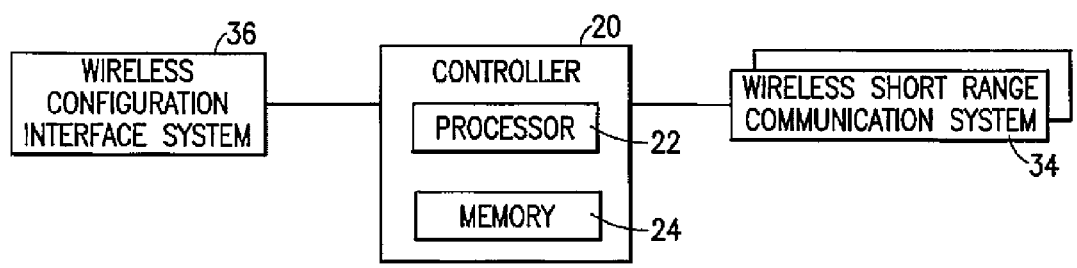
FIG. 2 is a diagram illustrating some of the components of the apparatus shown in FIG. 1.

The receiver 16 and transmitter 18 form a wireless mobile communication interface to allow the apparatus 10 to communicate with a wireless telephone system, such as a mobile telephone base station for example. The wireless mobile communication interface 16, 18 may allow the apparatus 10 to communicate such as by 4G, 4G LTE, 3G, CDMA, etc. for example. However, in an alternate example embodiment the receiver 16 and transmitter 18 might not be provided, such as when the apparatus 10 does not have telephone capabilities. For example, the apparatus 10 might merely be a gaming device, or a music/video player, or a user handset for a television console. Internet, access for the apparatus 10 might be provided by a short range communications system through the television console or a wireless WLAN for example. These are only some examples, and should not be considered as limiting. As shown in FIG. 2, in addition to the wireless mobile communication interface 16, 18, the apparatus 10 also comprises at least one wireless short range communications system 34. This wireless short range communications system 34 comprises an antenna, a transmitter and a receiver for wireless radio frequency communications. The range may be, for example, only about 30 feet (10 meters) or less. However, the range might be 60 feet (20 meters) or more for example. More than one wireless short range communications system 34 could be provided.

Figure 3:
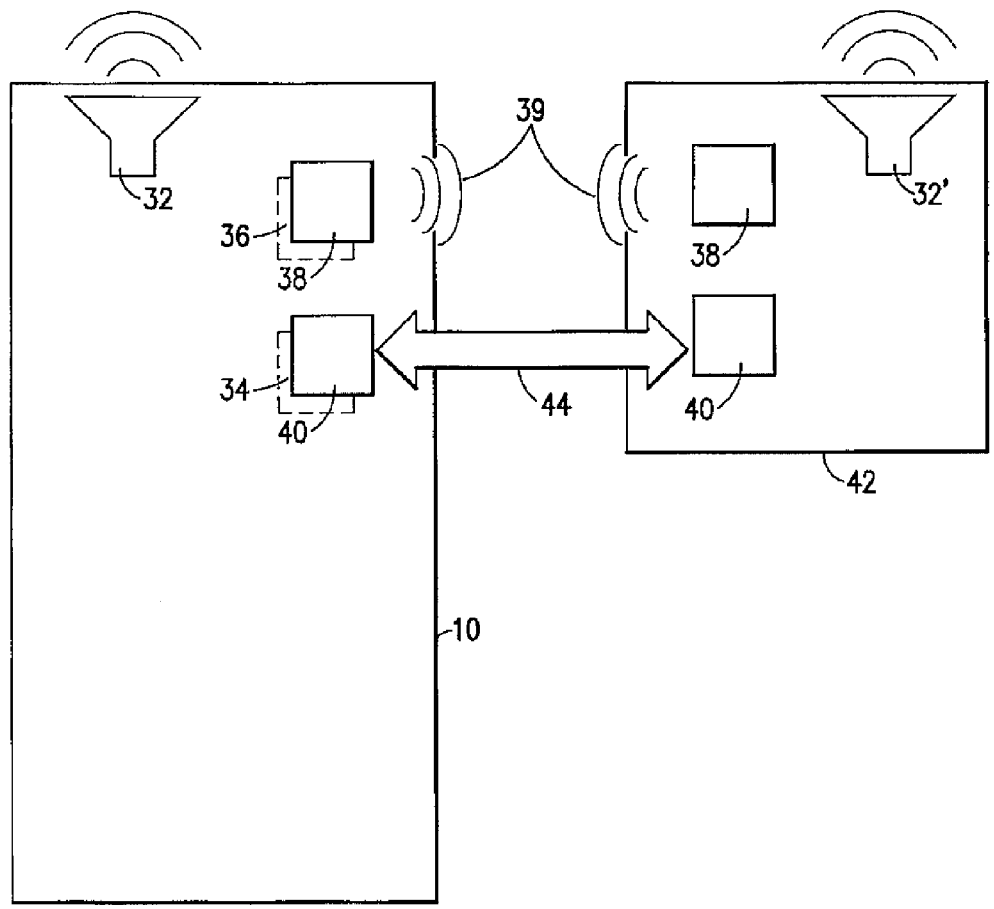
FIG. 3 is a diagram illustrating communications between the apparatus shown in FIG. 1 and another device.

The short range communications system 34 may use transmissions creating a personal area network (PANs) with high levels of security. This may be a BLUETOOTH communications system for example. In the example shown, the apparatus 10 has two of the short range communication systems 34; BLUETOOTH and WiFi. BLUETOOTH and WiFi are mentioned merely as examples, and should not be considered as limiting. More or less than two short range communication systems could be provided including, for example, AIRPLAY and WiFi DLNA. The short range communications system 34 may be used to connect the apparatus 10 another device, such as an accessory headset, a mouse, a keyboard, a display, an automobile radio system, or any other suitable device. An example is shown in FIG. 3 where the apparatus 10 is shown with a BLUETOOTH chip 40. The BLUETOOTH chip 40 forms a wireless short range communication interface which comprises the short range transmitter, receiver and antenna. In the example shown in FIG. 3, the device 42 is a wireless speaker having a BLUETOOTH chip 40. A short range digital wireless communication link 44 may be established between the two chips 40.

As seen in FIG. 2, the apparatus 10 also comprises a wireless configuration interface system 36. In this example the wireless configuration interface system 36 comprises a Near Field Communication (NFC) chip 38 as a wireless configuration interface which comprises an induction coil. The device 42 also has electronic circuitry with a Near Field Communication (NFC) chip 38 which comprises an induction coil. The Near Field Communication (NFC) chips 38 are configured to allow wireless communication between the apparatus 10 and the device 42 via induction at the coils using magnet field signals 39. In an alternative example, NFC might not be used. In general, any suitable type of proximity based wireless configuration interface may be used. A proximity based wireless configuration interface may be used to exchange data for configuring and establishing connection 44 (for example BLUETOOTH pairing). In this example, the proximity based wireless configuration interface is also used to pass any data from the client 42 which may be needed by the host apparatus 10 to ensure audio and/or video streaming; preferably in a synchronized way.

In the past, creating proximity based wireless configuration (such as BLUETOOTH pairing for example) between an apparatus and another device (such as an accessory device for example) required multiple stages before getting the connection done. In smartphones, Near Field Communication (NFC) has been introduced in many of the accessories to improve the usability and make the BLUETOOTH pairing as easy as possible. The NFC is used to initiate the BLUETOOTH pairing. NFC is normally provided via its own chipset which includes an antenna. The Near Field Communication Forum (NFC Forum) formed in 2004 promotes sharing, pairing, and transactions between NFC devices and develops and certifies device compliance with NFC standards. A smartphone or tablet with an NFC chip could make a credit card payment or serve as keycard or ID card. NFC devices can read NFC tags on a museum or retail display to get more information or an audio or video presentation. NFC can share a contact, photo, song, application, or video or pair Bluetooth devices. NFC is a set of short-range wireless technologies, typically requiring a distance of 4 cm or less. NFC operates at 13.56 MHz on ISO/IEC 18000-3 air interface and at rates ranging from 106 kbit/s to 424 kbit/s. NFC always involves an initiator and a target; the initiator actively generates an RF field that can power a passive target. This enables NFC targets to take very simple form factors such as tags, stickers, key fobs, or cards that do not require batteries. NFC peer-to-peer communication is of course possible, where both devices are powered.

Rather than a NFC chip, the wireless configuration interface system 36 may comprise a RSSI based wireless proximity configuration interface. RSSI (Received Signal Strength Indicator) is a measurement of the power present in a received radio signal. As seen in FIG. 3, the wireless configuration interface system 36 may comprise more than one wireless configuration interface, such as both a NFC chip and a RSSI based wireless proximity configuration interface for example.

The wireless configuration interface system 36 may be used to at least partially configure and help establish a communications link 44 between the apparatus and the device 42. For example, if a BLUETOOTH communications link is being established as the link 44, pairing may be used. The apparatus 10 is configured to play media, such as audio from the speaker 32 and/or video on the display 14. The media may include, for example, music, movies, etc. The media may include multichannel media such as 7:1, 5:1, or stereo music, or even mono music for example. The apparatus 10 might only have one or two speakers 32. To enhance playing of the media, the apparatus 10 is configured to transmit (via the connection 44) at least one of the channels of the media to the device 42 for playing. For example, if the media is stereo music after the apparatus 10 is connected to the device 42 with a wireless link 44, the apparatus 10 may be configured such that the apparatus 10 only plays the right channel of the stereo music from the speaker 32, and transmits the left channel of the stereo music via the link 44 to the device 42 for the device 42 to play the left channel on the speaker 32'. As another example, if the media includes mono music, the mono music may be played from the speaker 32 and also transmitted via the link 44 to the device 42 for the device 42 to play on the speaker 32'. In this example the multichannel media might have video as one channel and mono sound as another channel. For this video channel and mono channel multichannel music, the two channels might be played on the apparatus 10, and only the video channel might be transmitted by the link to the device 42. These are only some examples, and should not be considered as limiting.

Figure 4:
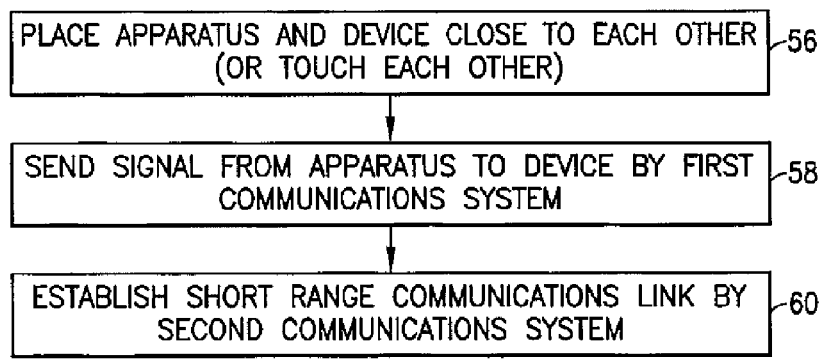
FIG. 4 is a diagram illustrating steps of an example method.

Referring also to FIG. 4, an example method may comprises placing the apparatus 10 and the device 42 in close proximity to each other, or perhaps touch each other as indicated by block 56. The coil of the NFC chip 38 of the apparatus 10 may then be used to send a signal (see FIG. 3) to the coil of the NFC chip 38 of the device 42 as a first communications system as indicated by block 58. The signal 39 may be by means of analog magnetic field variations. After the coil receives the signal 39, the circuitry in the device 42 may be configured at least partially help establish a second different communications link 44 as illustrated by block 60 via the wireless short range communication system 34, such as with BLUETOOTH chips 40 or WiFi for example. As seen in FIG. 3, the NFC coil of the device 42 may be used to send a signal 39 back to the NFC coil of the apparatus 10.

There are different possible methods of using the two communication systems 34, 36 noted above. In one example type of method, the signal 39 could be used to wake up the device 42, and the device using the signal 39 to transmit configuration information or streaming synchronization back to the apparatus 10. In another example type of method, the apparatus 10 and device 42 might already be bonded to each other (BLUETOOTH pairing occurred previously) but the device 42 is not awake. The signal 39 might merely be a wake-up signal. In another example type of method, the device 42 might already be awake and the signal 39 could comprise configuration information. These are merely non-limiting examples.

In one type of example the signal 39 may comprise a wake-up signal to wake up the device 42. When the user locates his/her apparatus 10 close to the device 42 this will cause the NFC coil in device 42 to be under the apparatus' magnetic field fluctuations. This may initiate a voltage raise in device 42 from the NFC coil, and recognition of the signal 39 may work as an initiation for the device 42 to power up from idle. With the device 42 now awake, the wake-up pulse from the signal 39 may be used to identify or verify the wake-up situation. After wake up, the pairing information via the signal 39 may be sent to the apparatus 10 using the same type of modulation mechanism via the NFC coils.

Figure 5:
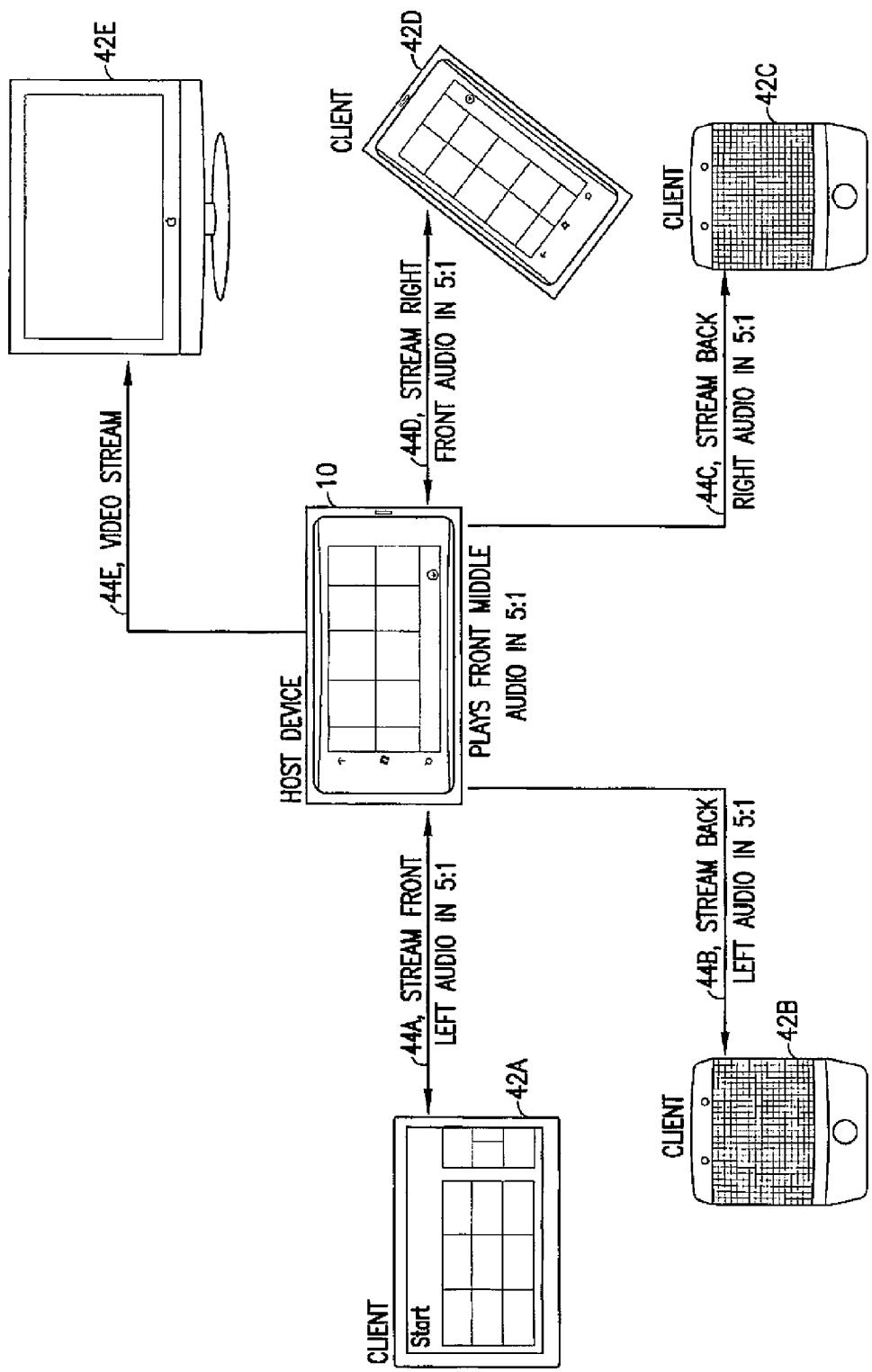
FIG. 5 is an illustration showing connection of the apparatus shown in FIG. 1 to multiple devices with multiple separate communications links and respective multichannel media roles in one example use case.

In this example embodiment the apparatus 10 is configured to be wirelessly connected with more than one device 42 at a same time. Referring also to FIG. 5, the apparatus 10 is shown connected to five devices 42A, 42B, 42C, 42D, 42E by five separate links 44A, 44B, 44C, 44D, 44E. However, in alternative examples, more or less than five devices and five links could be provided. In this example the five devices include a computer tablet device 42A, two wireless speakers 42B, 42C, another person's smart phone 42D, and a television 42E with wireless connectivity. In this example the apparatus 10 functions as a host and the devices 42 function as clients. The apparatus 10 is configured to transmit at least some different channels of a multichannel media separately to each of the devices 42 via the individual links 44.

Figure 6:
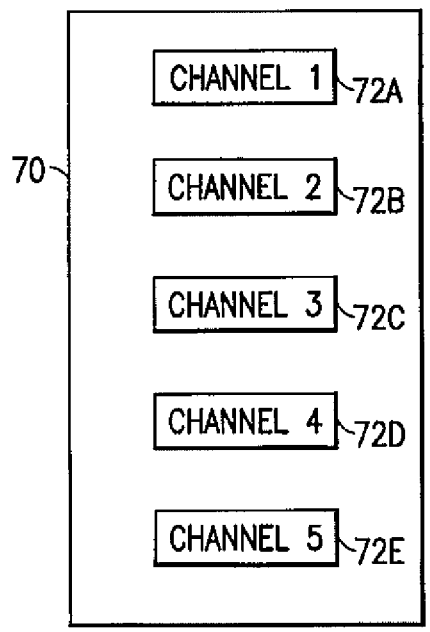
FIG. 6 is a diagram illustrating multichannel media.

Referring also to FIG. 6, an example of one type of multichannel media 70 is shown. In this example the multichannel media 70 is music data comprising 5.1 surround sound format including the five channels 72A, 72B, 72C, 72D, 72E corresponding to front left, back left, back right, front right, and front middle respectively. In the example shown in FIG. 5, the apparatus 10 may use the link 44A to transmit the front left channel 72A of the media 70 to the device 42A. The apparatus 10 may use the link 44B to transmit the rear left channel 72B of the media 70 to the device 42B. The apparatus 10 may use the link 44C to transmit the rear right channel 72C of the media 70 to the device 42C. The apparatus 10 may use the link 44D to transmit the front right channel 72D of the media 70 to the device 42D. The apparatus 10 may use the link 44E to transmit the front middle channel 72E of the media 70 to the device 42E, and/or play the front middle channel 72E itself from the speaker 32. This is only an example, and should not be considered as limiting. The number of devices connected to the apparatus 10 may be more or less than five. Thus, assignment of channels to devices may vary as better understood from the description below. Other examples of multichannel media include, for example, media having 7.1 channel surround sound format, SONY Dynamic Digital Sound (SDDS) having eight channels, and stereo music having two channels.

As another example with reference to FIG. 5, if the multichannel media is video and stereo music, the video channel(s) may be transmitted by the links 44A, 44D, 44E to be played on the display of the devices 42A, 42D, 42E, the left channel of the music may be transmitted by the links 44A, 44B to be played by the devices 42A, 42B, and the right channel of the music may be transmitted by the links 44C, 44D to be played by the devices 42C, 42D. The left and/or right stereo music channels may be transmitted by the link 44E to be played on the device 42E. The host device 10 may or may not also play any of the channels video channel(s) or audio channels(s). Again, this is only an example to illustrate that different channels (and perhaps different combinations of channels) may be transmitted to different devices. Not all channels need to be transmitted by each link 44.

Figure 7:
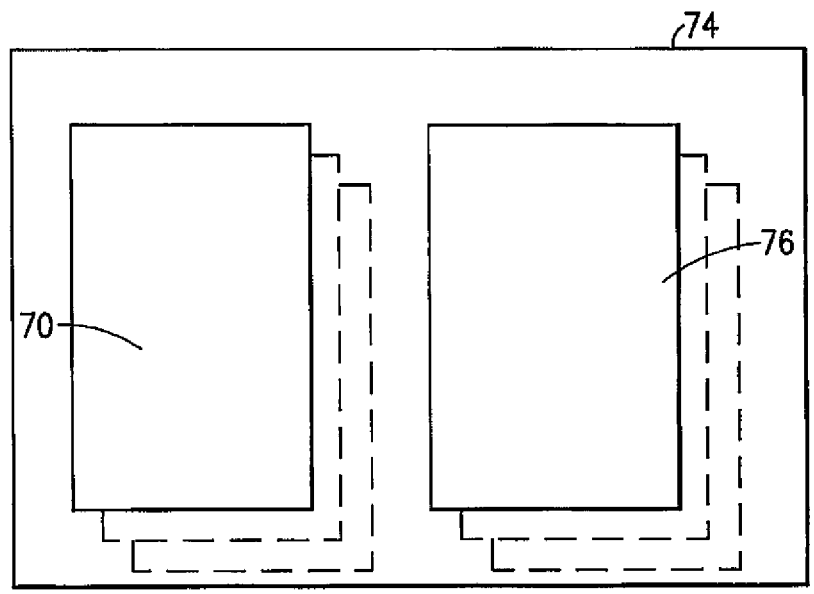
FIG. 7 is a diagram illustrating a different multichannel media.

Referring also to FIG. 7, one type of multichannel media 74 may comprise one or more multichannel sound components 70 and one or more other media components 76 such as video (single channel video or multichannel video) for example. In the example shown in FIG. 5, the other media component 76 may be transmitted from the apparatus 10 to the television 42E via the link 44E. Likewise, one or more of the other media components 76 (or different channels of the media component(s) 76), such as video for example, may be transmitted to the devices 42 having display screens, such as the tablet 42A and the smart phone 42D for example.

Today, people expect their multiple devices to work together, and to provide seamless experience and even content across their phones, tablets, computers and even TVs. This is expected to happen without multistep configuration of connectivity or detailed information about how sharing happened. Audio is probable the strongest form for shared media consumption today. Music is listened to from almost every form of computerized personal communications device. Wireless portable speakers are becoming more prevalent thanks to BLUETOOTH, WiFi DLNA and APPLE AIRPLAY technologies.

With features as described herein, setup for playing multichannel media with multiple devices, such as audio setup, may be created between multiple devices by means of touch or proximity connectivity. This may include different devices, such as the tablet, speakers, smart phone, television shown in FIG. 5 for example. Configuring multiple wireless devices to form stereo or 5:1 or 7:1 (or any other N:M audio setup) has been difficult in the past from a connectivity establishment and audio compatibility point of view. The NOKIA PLAY 360 has shown that a single phone to dedicated speaker device can be done, but not for example in stereo between a first phone and another phone or tablet taking the role of the left and right speakers.

There are wireless surround system devices known, but they are dedicates devices for this purpose; not general devices (such as a tablet, a smart phone or a television for example) which have wireless and touch interface with media reproduction capability (such as audio and/or video media). In addition, although host device broadcasting is a well-known concept, it streams the same audio channel for multiple capable devices. In the past, host device broadcasting did not include synchronization between a host and a client(s) and, hence, cannot reproduce multichannel audio setups. In addition these work only within a single protocol, such as either BLUETOOTH or, alternatively, WiFi.

Features, as described herein, enable an audio surround experience between devices from different manufacturers/vendors and/or between multiple types of different devices by utilizing touch or proximity based connectivity configuration, and by utilizing dedicated audio streams to devices. The devices may be any of those having audio streaming interface and capability to reproduce audio from this stream. This also applies to video media as well. A host device, such as the apparatus 10, may be able to send synchronized wireless audio/video streams to separate devices, such as the devices 42A-42E for example. Streaming capability may include delay synchronization between the host and the client(s), and customization (transcoding) of stream audio/video content for a targeted client device. Host device (apparatus 10 in this example) may have a touch based or proximity based interface, such as NFC or RSSI based wireless proximity for example, to read the configuration parameters for connectivity of the client device(s) 42. Host device may also use the touch based or proximity based interface to read the capability of the client device to reproduce audio/video streams (such as delay, volume, frequency response, supported codec, operating time, etc).

In one type of example, the apparatus 10 (as the host device) also has the capability to adjust a number of client devices based on need, such as if an operating time of a client device runs out then this client device is dropped in a controlled manner; perhaps adjusting audio constellation accordingly. For example adjusting constellation from 7:1 to 5:1, or from stereo to mono. As noted above, the wireless short range communications interface may be WiFi, BLUETOOTH, AIRPLAY, WiFi DLNA or any dedicated point-to-point protocol, such as used for streaming of audio and/or video. For example, in the example use shown in FIG. 5, links 44A and 44D may be WiFi, links 44B and 44C may be BLUETOOTH, and link 44E may be both WiFi and BLUETOOTH.

A client device 42 has a touch based or proximity based wireless configuration interface, such as NFC or RSSI based wireless proximity for example, in order to pass the connectivity method and parameters for the prospective subsequently formed respective link 44 to the apparatus 10 (forming the host device) as well as the streaming capability of the client device 42 over the connectivity technology to be used. The apparatus 10 is, thus, able to connect not only to a wireless speaker (such as the NOKIA PLAY 360), but also to any suitable mobile phone/tablet/notebook/tablet which includes the needed media playing functionality, such as a speaker or display screen for example. One or more of the client devices 42 may also have memory recording capability to record the received multimedia channel(s). The features, as described herein, allow an apparatus (such as a smart phone or computer tablet for example) to function as a host and be connected to at least one client device (such as another smart phone, computer tablet, etc.) to create a new way of experiencing media at a same time (such as audio and/or audio video for example) in a separated but collective playing mode; using people's existing phone/tablet/speaker/etc. as the client device(s). This may enhance both sharing experiences and response to the need to have device experience beyond a single device.

In one example, a user of the apparatus 10 may collect information from the NFC tags of the devices 42, and then select, such as from the user interface 14 of the apparatus 10 for example, which links 44 should be formed for each channel, or which channel(s) should be sent in each link 44. In one type of example, the apparatus 10 may read the NFC content from a second client device, and then transfer that information to the first client device; perhaps asking the first client device to connect to the second client device based on that NFC information. For example, with reference to FIG. 5, the apparatus 10 may read the NEC content from speaker 42C, and then transfer that information to the Smartphone 42D; perhaps asking the Smartphone 42D to connect to the speaker 42C by a directly link between the two devices 43C, 42D. This is not technical dependent, so whatever Wireless technology is used this same feature can be used.

This is easily expandable to Wireless Multi-speaker systems as well, for example with the two speakers 42B, 42C. In the apparatus 10, the user may have the an application running in the background. When the user touches the apparatus 10 to the first speaker 42B, the apparatus 10 may read the NFC content of the NFC chip in the first speaker 42B and forms the link 44B to connect to first speaker 42B. The application will get an indication of the connected device. After the connection is created to first speaker 423, the application may pop-up a question to user on the display 14 such as "Do you have another similar speaker: Yes/No". If user selects "Yes", the user interface 14 may ask the user to touch the second speaker 42C. After reading the second speaker NFC, the user interface 14 of the apparatus 10 may show to the user text such as "Connecting the Speakers". Technically, the apparatus 10 may send the NFC content of the second speaker 42C to the first speaker 423, which then connects speakers 42B, 42C together. When the speakers 42B, 42C are connected, the text may disappear from the user interface 14 of the apparatus 10.

Figure 8:
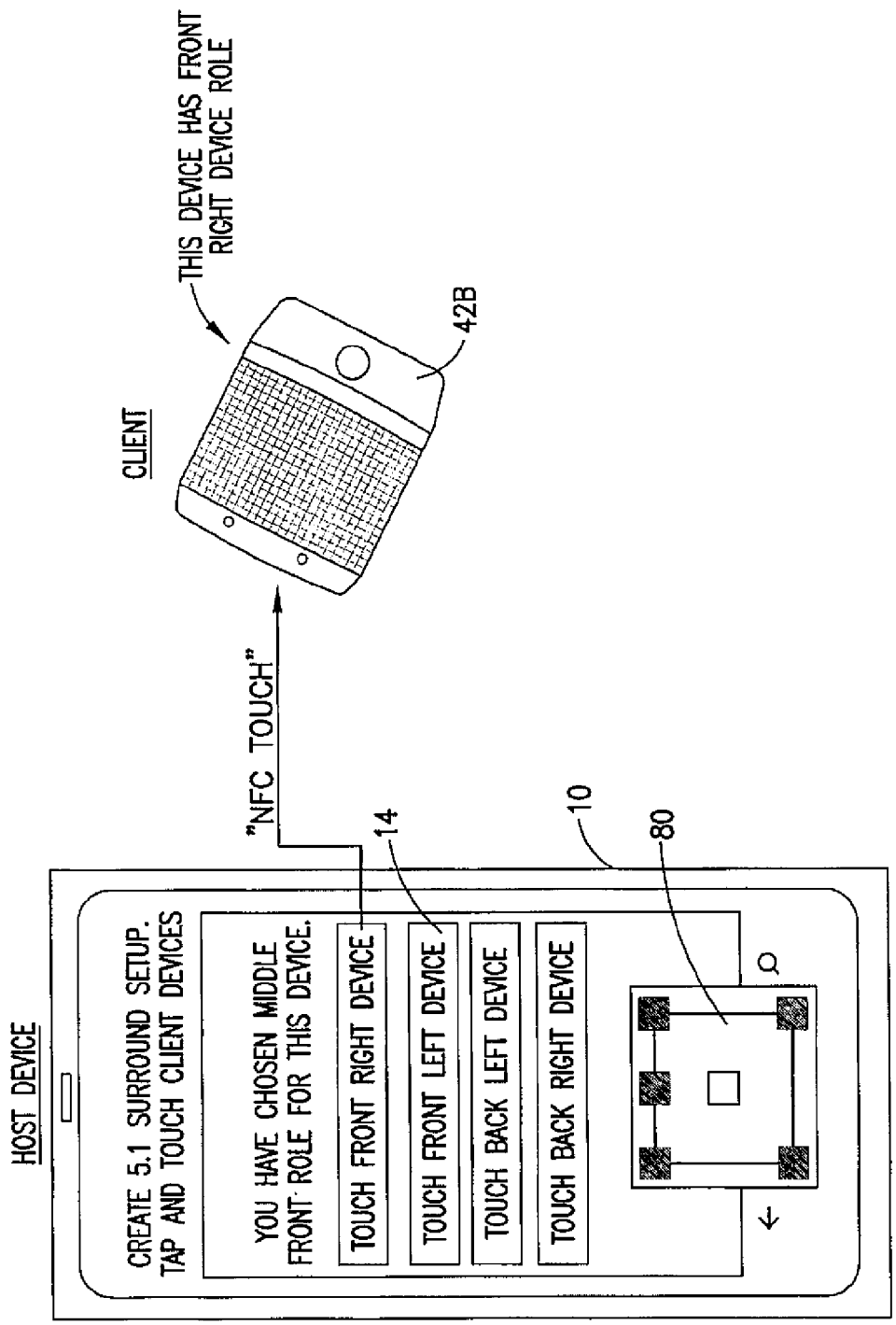
FIG. 8 is a diagram illustrating the apparatus shown in FIG. 1 being connected to one of the devices shown in FIG. 5.

Referring also to FIG. 8, an example of a user interface on the display 14 of the apparatus 10 is shown during a set up process similar to FIG. 5. In this example the software in the apparatus 10 is configured to prompt the user of the apparatus 10 to select a channel which should be assigned to the device 42B, and touch the apparatus 10 and device 42B together to thereby use the proximity based wireless configuration interface system (such as NFC in this example) to establish a link 44 or assign the link to one or more channels of the multichannel media. The user may do this for each one of the devices 42. The user interface also provides a visual graphic 80 illustrating which of the five channels have been assigned. When the system is fully configurable, the same channel may be streamed to multiple devices as well as the mono. The host device 10 may also convert multi-channel audio into mono, and send the mono audio to each connected device. Also, with features as described herein, a user may decides/configure which channel belongs to which device by use of the user interface of the apparatus; the channel allocation/distribution decision being made, at least partially, by the user. The controller 20 might be able to make this channel allocation/distribution decision based upon other factors, such as sensors for example. For example, the apparatus 10 might use its microphone(s) and software to adjust channel allocation/distribution among the client devices.

Figure 9:
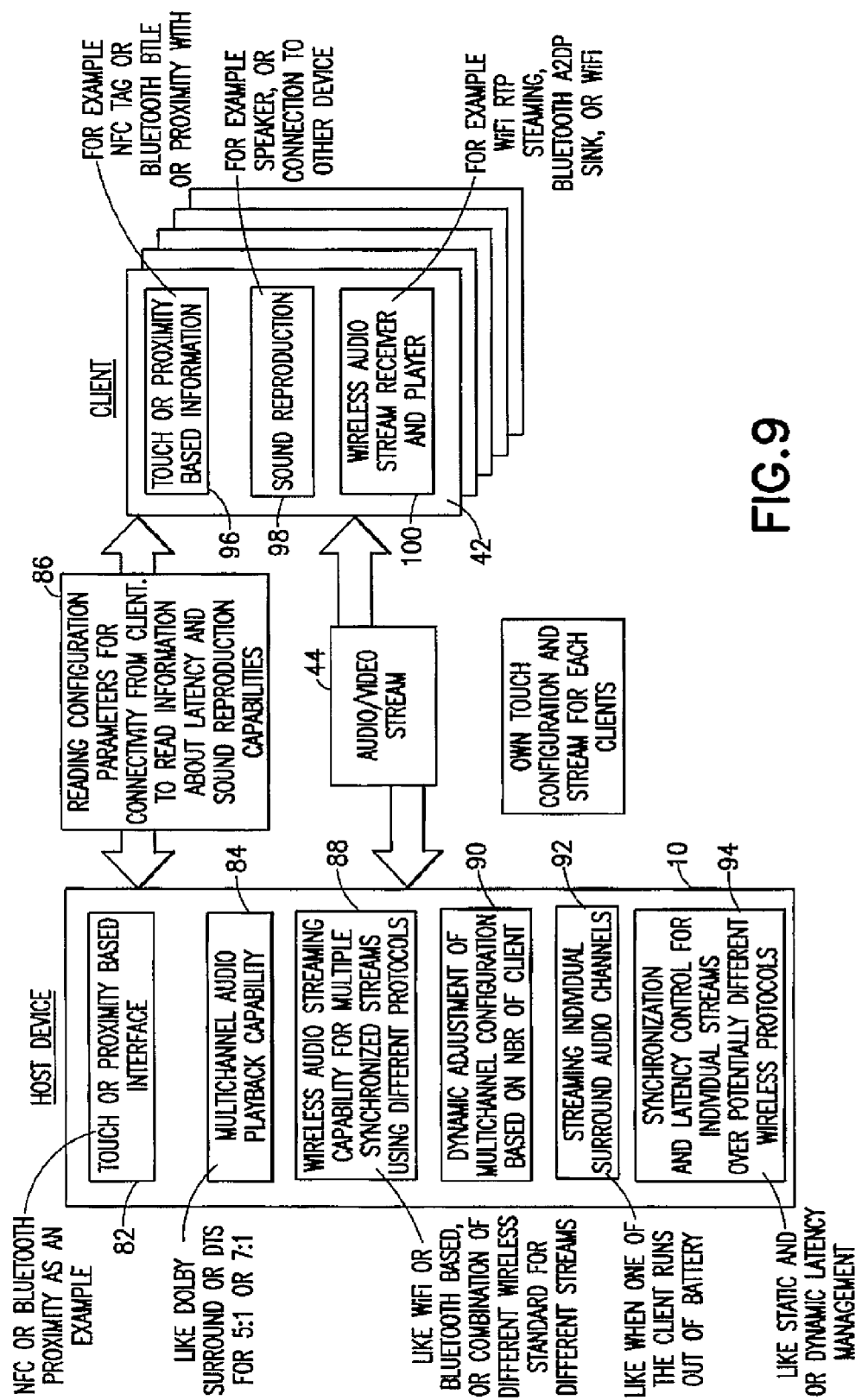
FIG. 9 is a diagram illustrating features of the apparatus and devices of FIG. 5 and examples of their connectivity.

Referring also to FIG. 9, an example technical conceptual implementation may comprise the apparatus 10 with a touch or proximity based interface 82 and a multichannel audio playback capability 84. The touch or proximity based interface 82 may be NFC or BLUETOOTH proximity as an example. The multichannel audio playback capability 84 may be DOLBY Surround or DTS for 5.1 or 7.1 for example. The apparatus 10 has wireless audio streaming capability 88 for multiple synchronized streams using different protocols, such as WiFi or BLUETOOTH based, or combination of different wireless standard for different streams for example. The apparatus 10 may be configured to provide a dynamic adjustment 90 of multichannel configuration based on a number of client devices, such as when one of the client devices runs out of battery for example. The apparatus 10 is configured for streaming 92 individual surround audio channels. The apparatus 10 may have synchronization and latency control for individual streams over potentially different wireless protocols, such as static and or dynamic latency management for example.

Each of the client devices 42 may have touch or proximity based information 96, such as a NFC tag or BLUETOOTH BTLE or proximity with RSSI for example. Each of the client devices 42 may have media reproduction capability 98 such as sound and/or video reproduction/playing capability. Each of the client devices 42 may have a wireless audio stream receiver and player 100 such as WiFI RTP steaming, BLUETOOTH A2DP sink, or WiFi for example. A first connection system 86 uses the magnet field signals 39 of the wireless configuration interface system for reading configuration parameters for connectivity from the client. To read information about latency and sound reproduction capabilities. A second connection system then forms the links 44.

In one example embodiment, an apparatus 10 comprises a wireless configuration interface system 36, 82 which is adapted to configure a communication link to be established between/among the apparatus and at least one device 42; and a wireless communication system 88 which, after having been connected with the at least one device, is configured to separately transmit to each of the at least one device a different channel 72 of multichannel media 70 to be played substantially synchronized on a combination of a plurality of the devices 42 or on the apparatus 10 and the at least one device 42.

The wireless configuration interface system 36, may be configured to assist in connecting the apparatus with at least one device by Near Field Communication (NFC) or by another proximity based short range communication. The wireless communication system may be configured to transmit on a plurality of different wireless communication protocols, where the wireless communication system is configured to transmit a first one of the channels to a first one of the devices with a first wireless communication protocol and a second different one of the channels to a second one of the devices with a second different wireless communication protocol. The wireless configuration interface system 36, 82 may be configured to pair the apparatus 10 with the at least one device 42 based upon the at least one device being brought into a proximity to the apparatus of about 20 cm or less. The apparatus may further comprise a controller 20 connected to the wireless communication system 88, where the controller 20 is configured to at least partially assign the channels to the plurality of the devices or to the apparatus and the at least one device. The controller 20 may be configured to allow a user to assign at least one of the channels to at least one of the devices and/or apparatus. The controller 20 may be configured to automatically reassign at least one of the channels to at least one of the devices and/or apparatus based upon a predetermined event. The predetermined event may be the apparatus 10 loosing the connection link 44 with one or more of the previously connected devices 42. The controller 20 may be configured to automatically reassign at least one of the channels to at least one of the devices and/or apparatus based at least partially upon a number of the devices paired and communicating with the apparatus. The controller 20 may be configured to dynamically adjust channel assignment of the channels to the apparatus and/or device(s) based, at least partially, on transmitting to one of the devices being dropped by the apparatus during playing of the media. The controller 20 may be configured to dynamically adjust audio constellation of the media being played based, at least partially, on transmission 44 to one of the devices being dropped by the apparatus during playing of the media. The controller 20 may be configured to control synchronization and latency for the channels over different wireless protocols.

The apparatus 10 may further comprise a system for determining media reproduction capabilities of the at least one device 42, and a controller 20 configured to assign the at least one channel to the at least one device based upon the determined media reproduction capabilities of the at least one device. The apparatus may further comprise means for proximity based pairing of the apparatus with the at least one device and means for respective dedicated channel media streaming of the channels of the multichannel media to the at least one device. The apparatus may further comprise means for dynamically adjusting channel allocation by the apparatus among the apparatus and the at least one device based upon a predetermined event.

In accordance with another example, an apparatus 10 comprises a wireless configuration interface system 36, 82 configured to at least partially pair, for wireless communication, the apparatus with at least one client device 42; and a controller 20 configured to assign at least one different channel of multichannel media to a plurality of the client devices or to the apparatus and the at least one client device, where the apparatus is configured to stream at least some of the channels of multichannel media to the at least one client device for the channels of the multichannel media to be played at a substantially same time on a combination of a plurality of the devices or on the apparatus and the at least one device.

The wireless configuration interface system 36, 82 may be configured to pair the apparatus with at least one device by Near Field Communication (NFC) or by a proximity based short range communication. The controller 20 may be configured to allow a user to assign at least one of the channels to at least one of the devices and/or apparatus. The controller 20 may be configured to automatically reassign at least one of the channels to at least one of the devices and/or apparatus based upon a predetermined event. The controller 20 may be configured to automatically reassign at least one of the channels to at least one of the devices and/or apparatus based at least partially upon a number of the devices paired and communicating with the apparatus. The controller 20 may be configured to dynamically adjust channel assignment of the channels to the apparatus and/or device(s) based, at least partially, on a predetermined event. The controller 20 may be configured to dynamically adjust audio constellation of the media being played based, at least partially, on a predetermined event. The controller 20 may be connected to a wireless communication system of the apparatus, where the controller is configured to control synchronization and latency for the channels over different wireless protocols.

Referring also to FIG. 10, an example method may comprise configuring a host apparatus for communication with at least one client device via a wireless configuration interface as indicated by block 102; assigning as indicated by block 104 at least one different channel of multichannel media to respective ones of the host apparatus and the at least one client device or to a plurality of the at least one client device, respectively; and transmitting as indicated by block 106, via at least one wireless communication protocol, at least one of the different channels of the multichannel media from the host apparatus to the at least one client device for the channels of the multichannel media to be played at a substantially same time by a combination of the plurality of the client devices or by the host apparatus and the at least one client device. Transmitting the at least one of the different channels of the multichannel media from the host apparatus may be done via at least two different wireless communication protocols. Transmitting the at least one of the different channels of the multichannel media from the host apparatus may be done via one wireless communication protocol.

In one example embodiment, a non-transitory program storage device 24 readable by a machine is provided, tangibly embodying a program of instructions executable by the machine for performing operations, the operations comprising configuring a host apparatus for communication with at least one client device via a wireless configuration interface; assigning at least one different channel of multichannel media to respective ones of the host apparatus and the at least one client device or to a plurality of the at least one client device, respectively; and transmitting, via at least one wireless communication protocol, at least one of the different respective channels of the multichannel media from the host apparatus to the at least one client device for the channels of the multichannel media to be played at a substantially same time by a combination of the plurality of the client devices or by the host apparatus and the at least one client device. The host device may take care of synchronization and media transcoding. The host device may read needed information for synchronization and media transcoding from a client device when a touch based wireless configuring interface is used.

In one example use, one or more of the devices may receive more than one of the channels. For example, with a 5.1 channel media, if there is only the apparatus 10 and two of the devices 42, one device might get front and rear left channels, the other device might get the front and rear right channels, and the apparatus 10 might play the front middle channel. In one example use, more than one device may receive a same channel. For example, if there are ten of the devices, two of the devices might get the front left channel 72A, two different ones of the devices might get the back left channel 72B, two different ones of the devices might get the back right channel 72C, two different ones of the devices might get the front right channel 72D, and two different ones of the devices might get the front middle channel 72E. Thus, eleven friends with their smartphones in a room can collectively combine to use their smartphones together for playing different channels on the phones together for a better audio experience.

One type of example may be provided in an embodiment comprising a wireless configuration interface system 36 configured to assist in establishing a wireless communication connection 44 of the apparatus with at least one device 42; and a wireless communication system 34 which, after the wireless communication connection 44 has been established with the at least one device, is configured to separately transmit to each of the at least one device at least one channel of multichannel media for either: at least two of the devices to each play a different one of the channels of the multichannel media, or at least two of the apparatus and the at least one device to each play a different one of the channels of the multichannel media.

The wireless configuration interface system may comprise a proximity based wireless configuration interface 38. The wireless communication system may be configured to transmit on a plurality of different wireless short range communication protocols, where the wireless communication system is configured to transmit a first one of the channels to a first one of the devices with a first one of the different wireless short range communication protocols and a second different one of the channels to a second one of the devices with a second one of the different wireless short range communication protocols. The wireless configuration interface system may be adapted to configure subsequent communications between the apparatus and the at least one device based, at least partially, upon the at least one device and the apparatus being brought into a proximity to one another of about 20 cm or less. The embodiment may further comprise a controller 20 connected to the wireless communication system 34, where the controller is configured to at least partially assign the channels to the at least one device and/or the apparatus. The controller may be configured to allow a user to selectively assign at least one of the channels 72 to the at least one device 42 and/or the apparatus 10. The controller may be configured to automatically reassign at least one of the channels 72 to at least one of the devices and/or the apparatus based upon a predetermined event. The controller may be configured to automatically reassign at least one of the channels to at least one of the devices and/or the apparatus based at least partially upon a number of the devices communicating with the apparatus. The controller may be configured to dynamically adjust channel assignment of the channels to the apparatus and/or the device(s) based, at least partially, on transmitting of at least one of the channels to one of the devices being dropped by the apparatus during playing of the media. The controller may be configured to dynamically adjust audio constellation of the media being played based, at least partially, on transmission to one of the devices being dropped by the apparatus during playing of the media. The embodiment may further comprise a controller connected to the wireless communication system, where the controller is configured to control synchronization and latency for the channels over different wireless protocols. The embodiment may further comprise a system for determining media reproduction capabilities of the at least one device, and a controller configured to assign the at least one channel to the at least one device based upon the determined media reproduction capabilities of the at least one device. The embodiment may further comprising means for proximity based configuring of the apparatus with the at least one device and means for respective dedicated channel media streaming of at least one of the channels of the multichannel media to the at least one device. The embodiment may further comprising means for dynamically adjusting channel allocation by the apparatus among the apparatus and the at least one device based upon a predetermined event. The embodiment may further comprise means for allowing a user to selectively configure allocation of the channels among the apparatus and/or the at least one device. The embodiment may further comprise a controller comprising software and a user interface connected to the controller which are configured to allow a user to selectively configure which of the channels are assigned to each of the at least one device and/or the apparatus.

Another example may be provide in an apparatus comprising a wireless configuration interface system 36 configured to at least partially assist in establishing a wireless communication connection of the apparatus 10 with at least one client device 42; and a system for allowing a user to configure channel allocation of channels of multichannel media to at least two of the at least one client device and the apparatus, where the apparatus is configured to stream at least one of the channels of multichannel media to the at least one client device for the channels of the multichannel media to be played at a substantially same time on a combination of at least two of the at least one device and the apparatus.

The wireless configuration interface system 36 may comprise a proximity based wireless configuration interface 38. The system for allowing a user to configure channel allocation comprises a controller 20 configured to automatically reassign at least one of the channels to at least one of the devices and/or the apparatus based upon a predetermined event. The system for allowing a user to configure channel allocation may comprise a controller 20 configured to automatically reassign at least one of the channels to at least one of the devices and/or the apparatus based at least partially upon a number of the devices communicating with the apparatus. The system for allowing a user to configure channel allocation may comprise a controller 20 configured to dynamically adjust channel assignment of the channels to the apparatus and/or device(s) based, at least partially, on a predetermined event. The system for allowing a user to configure channel allocation may comprise a controller configured to dynamically adjust audio constellation of the media being played based, at least partially, on a predetermined event. The system for allowing a user to configure channel allocation may comprise a controller connected to wireless short range communication interfaces of the apparatus, where the controller is configured to control synchronization and latency for the channels over different wireless protocols. The apparatus may further comprise a wireless short range communication system 34 which, after the wireless communication connection 44 has been established to the at least one device with the assistance of the wireless configuration interface system 36, is configured to separately transmit to each of the at least one device at least one of the channels of the multichannel media for either: at least two of the devices to each play at least one different one of the channels of the multichannel media, or at least two of the apparatus and the at least one device to each play at least one different one of the channels of the multichannel media.

An example method may comprise connecting a wireless short range communication interface of a host apparatus with at least one client device with assistance of a different wireless configuration interface of the host apparatus; and selectively configuring channel allocation of channels of multichannel media to at least two of the at least one client device and the host apparatus, where the host apparatus is configured to stream at least one of the channels of the multichannel media to the at least one client device for the channels of the multichannel media to be played at a substantially same time on a combination of at least two of the at least one device and the apparatus. Transmitting the at least one of the different channels of the multichannel media from the host apparatus may be done via at least two different wireless communication protocols.

In one example, a non-transitory program storage device may be provided which is readable by a machine, tangibly embodying a program of instructions executable by the machine for performing operations, the operations comprising connecting a wireless short range communication interface of a host apparatus with at least one client device with assistance of a different wireless configuration interface of the host apparatus; and selectively configuring channel allocation of channels of multichannel media to at least two of the at least one client device and the host apparatus, where the host apparatus is configured to stream at least one of the channels of the multichannel media to the at least one client device for the channels of the multichannel media to be played at a substantially same time on a combination of at least two of the at least one device and the apparatus.

It should be understood that the foregoing description is only illustrative. Various alternatives and modifications can be devised by those skilled in the art. For example, features recited in the various dependent claims could be combined with each other in any suitable combination(s). In addition, features from different embodiments described above could be selectively combined into a new embodiment. Accordingly, the description is intended to embrace all such alternatives, modifications and variances which fall within the scope of the appended claims.

What is claimed is:

1. A method comprising:
   presenting on a touch screen of an apparatus a plurality of indicia corresponding to channels of multichannel media, where at least two of the channels comprise audio signals of a sound source, where the plurality of indicia are indicative of at least one of:
   a front channel,
   a back channel,
   a center channel,
   a right channel, and
   a left channel;
   based upon the apparatus being moved into close proximity to a first device, establishing a wireless short range Communication connection of the apparatus with the first device via a first type of connectivity;
   after a first one of the indicia on the touch screen corresponding to at least a first one of the channels has been selected by a user, the apparatus associating the first device with the first channel for playing of the first channel of the multichannel media by the first device, where the associating of the first device with the first channel, after the first indicia on the touch screen has been selected by a user, is initiated based upon the establishment of the wireless short range communication connection of the apparatus with the first device via the first type of connectivity; and
   after the wireless short range communication connection has been established between the apparatus and the first device and after the apparatus associating the first device with the first channel for playing of the first channel of the multichannel media by the first device, transmitting the first channel of the multichannel media from the apparatus to the first device.

2. A method as in claim 1 where the plurality of indicia comprises a plurality of separate indicia each having an indication to a user of the apparatus how to associate the one of the channels with the first device and at least one other device.

3. A method as in claim 1 where the plurality of indicia comprises a channel diagram corresponding to a 5.1 surround sound setup, and wherein the audio signals in the at least two channels comprise audio signals from an at least partially common sound source.

4. A method as in claim 1 where the plurality of indicia comprises an indicate to a user to tap an icon on the touch screen and touch the apparatus to the first device to associate the first device with the first channel.

5. A method as in claim 1 where the wireless short range communication connection is a NFC connection.

6. A method as in claim 5 where transmitting the first channel of the multichannel media from the apparatus to the first device is via a different second type of connectivity which does not comprises the NFC connection.

7. An apparatus comprising:
a user interface,
a wireless short range communication system comprising electronic circuitry which is configured to separately transmit at least one channel of multichannel media for:
  at least two devices to each play a different one of the channels of the multichannel media, and/or
  at least two of the apparatus and at least one device to each play a different one of the channels of the multichannel media;
a controller connected to the user interface, where the controller comprises at least one processor, and at least one non-transitory memory including computer program code, the at least one memory and the computer program code configured to, with the at least one processor, cause the apparatus to:
  allow a user to use the user interface to selectively configure which of the channels are assigned to each of the apparatus and/or the device(s), where after a user has selected a first indicia on the user interface corresponding to at least a first one of the channels, and based upon an establishment of a wireless short range communication connection of the apparatus with a first one of the device(s), the apparatus associates the first device with the first channel for playing of the first channel of the multichannel media by the first device, where the associating of the first device with the first channel, after the user has selected the first indicia, is initiated based upon the establishment of the wireless short range communication connection of the apparatus with the first device via a first type of connectivity, where at least two of the channels comprise audio signals of a sound source, where the plurality of indicia are indicative of at least one of:
    a front channel,
    a back channel,
    a center channel,
    a right channel, and
    a left channel.

8. An apparatus as in claim 7 where the controller is configured to present on the user interface a plurality of the indicia corresponding to each of the channels of multichannel media; and based upon the apparatus being moved into close proximity to the first device, establish the wireless short range communication connection of the apparatus with the first device via the first type of connectivity, where the wireless short range communication system is configured to separately transmit the at least one channel of multichannel media via a second different type of connectivity.

9. An apparatus as in claim 8 where the controller is configured to display a plurality of separate indicia on the user interface, including the first indicia, at a same time, where each of the indicia has an indication to the user regarding how to associate the channels with the first device and at least one other device and/or the apparatus.

10. An apparatus as in claim 7 where the controller is configured to display on the user interface a channel diagram corresponding to a 5.1 surround sound setup along with the first indicia at a same time.

11. An apparatus as in claim 7 where the controller is configured to display on the user interface the first indicia comprising an indication to a user to tap an icon on the user interface and touch the apparatus to the first device to associate the first device with the first channel.

12. An apparatus as in claim 7 further comprising a NFC wireless configuration interface comprising electronic circuitry configured to assist in establishing the wireless short range communication connection by the wireless short range communication system of the apparatus with the first device, where the wireless configuration interface is configured to communicate with the first device via the first type of connectivity comprising NFC communication.

13. An apparatus as in claim 12 where the wireless short range communication system is configured to separately transmit the at least one channel of multichannel media to the device(s) via a different second type of connectivity which does not comprise NFC communication.

14. An apparatus comprising:
a wireless configuration interface comprising electronic circuitry configured to assist in establishing a wireless short range communication connection of the apparatus with at least one device, where the wireless configuration interface is configured to communicate with the at least one device via a first type of connectivity; and
a wireless short range communication system comprising electronic circuitry which, after the wireless short range communication connection has been established with the at least one device, is configured to separately transmit to the at least one device at least one channel of multichannel media via a different second type of connectivity for either:
  at least two of the devices to each play a different one of the channels of the multichannel media, or
  at least two of the apparatus and the at least one device to each play a different one of the channels of the multichannel media;
a controller connected to the wireless short range communication system, where the controller is configured to control synchronization for the channels over at least one wireless protocol, where the first type of connectivity is out-of-band from a wireless band used by the second type of connectivity; and
a user interface, where the controller is connected to the user interface,
where the controller comprises at least one processor, and at least one non-transitory memory including computer program code, the at least one memory and the computer program code configured to, with the at least one processor, cause the apparatus to:
  allow a user to use the user interface to selectively configure which of the channels are assigned to each of the apparatus and/or the device(s), where after a user has selected a first indicia on the user interface corresponding to at least a first one of the channels, and based upon an establishment of a wireless short range communication connection of the apparatus with a first one of the device(s), the apparatus associates a first one of the device(s) with the first channel for playing of the first channel of the multichannel media by the first one of the device(s), where the associating of the first one of the device(s) with the first channel, after the user has selected the first indicia, is initiated based upon the establishment of the wireless short range communication connection of the apparatus with the first one of the device(s) via the first type of connectivity.

15. An apparatus as in claim 14 where the controller is configured to control synchronization for the channels over two or more different wireless protocol.

16. An apparatus as in claim 14 where the controller is configured to present on the user interface a plurality of the indicia corresponding to each of the channels of multichannel media; and based upon the apparatus being moved into close proximity to the first device, establish the wireless short range communication connection of the apparatus with the first device via the first type of connectivity, where the wireless short range communication system is configured to separately transmit the at least one channel of multichannel media via the different second type of connectivity.

17. An apparatus as in claim 16 where the controller is configured to display a plurality of separate indicia on the user interface, including the first indicia, at a same time, where each of the indicia has an indication to the user regarding how to associate the channels with the first device and at least one other device and/or the apparatus.

18. An apparatus as in claim 14 where the controller is configured to display on the user interface a channel diagram corresponding to a 5.1 surround sound setup along with the first indicia at a same time.

19. An apparatus as in claim 14 where the controller is configured to display on the user interface the first indicia comprising an indication to a user to tap an icon on the user interface and touch the apparatus to the first device to associate the first device with the first channel.

20. An apparatus as in claim 14 further comprising a NFC wireless configuration interface comprising electronic circuitry configured to assist in establishing the wireless short range communication connection by the wireless short range communication system of the apparatus with the first device, where the wireless configuration interface is configured to communicate with the first device via the first type of connectivity comprising NFC communication.

21. An apparatus as in claim 20 where the wireless short range communication system is configured to separately transmit the at least one channel of multichannel media to the device(s) via the different second type of connectivity which does not comprise NFC communication.

* * * * *

UNITED STATES PATENT AND TRADEMARK OFFICE
CERTIFICATE OF CORRECTION

PATENT NO. : 9,762,317 B2
APPLICATION NO. : 14/809435
DATED : September 12, 2017
INVENTOR(S) : Timo J. Toivanen et al.

It is certified that error appears in the above-identified patent and that said Letters Patent is hereby corrected as shown below:

On the Title Page (54), "Mutichannel" should be deleted and --Multichannel-- should be inserted.

Signed and Sealed this
Seventh Day of November, 2017

Joseph Matal
*Performing the Functions and Duties of the
Under Secretary of Commerce for Intellectual Property and
Director of the United States Patent and Trademark Office*